Figure 1:
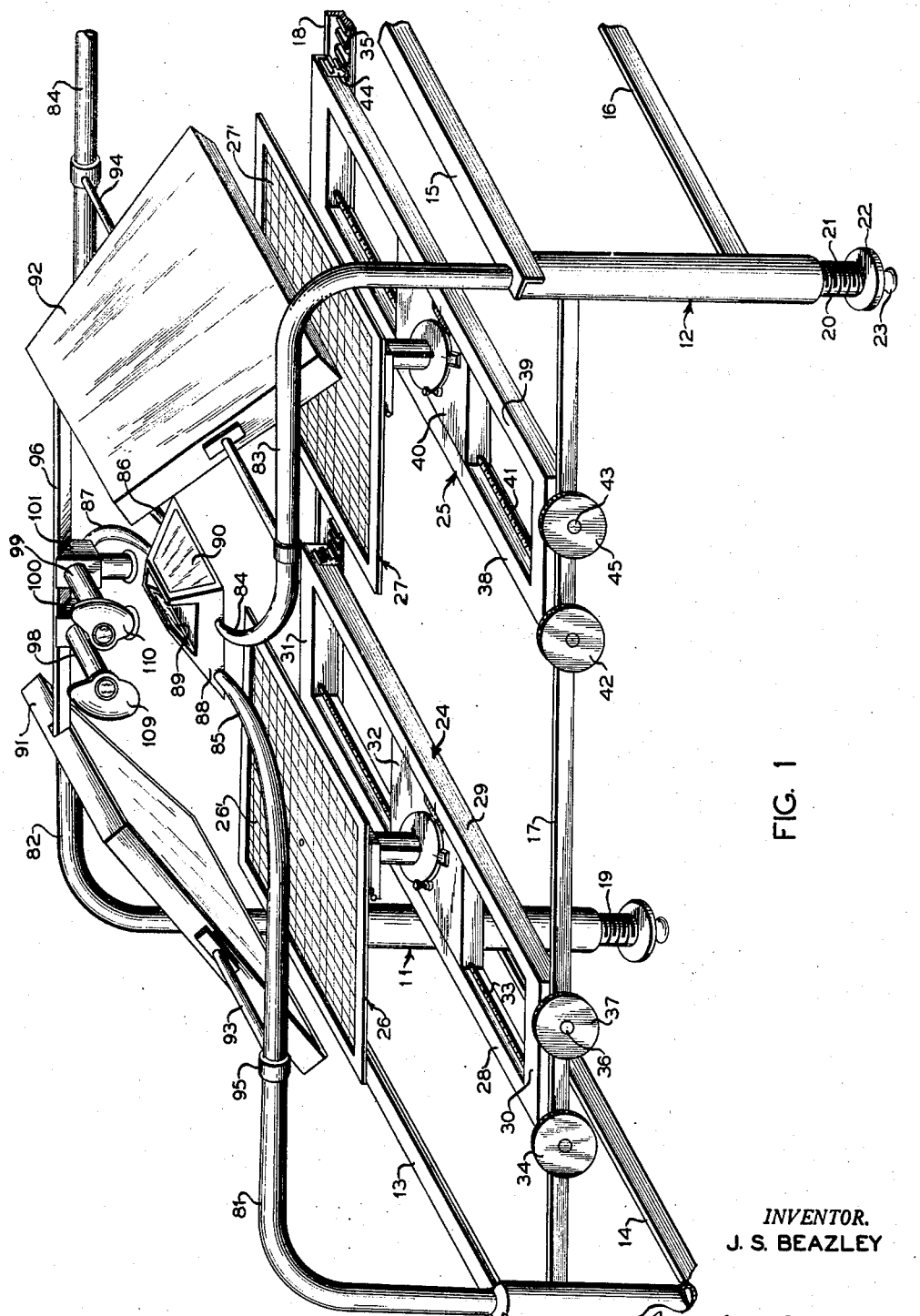

May 29, 1951

J. S. BEAZLEY 2,555,106

STEREOSCOPIC PLOTTING INSTRUMENT

Filed Oct. 8, 1946

3 Sheets-Sheet 1

INVENTOR.
J. S. BEAZLEY

BY *A. Yates Dowell*

ATTORNEY

May 29, 1951  J. S. BEAZLEY  2,555,106
STEREOSCOPIC PLOTTING INSTRUMENT
Filed Oct. 8, 1946  3 Sheets-Sheet 2
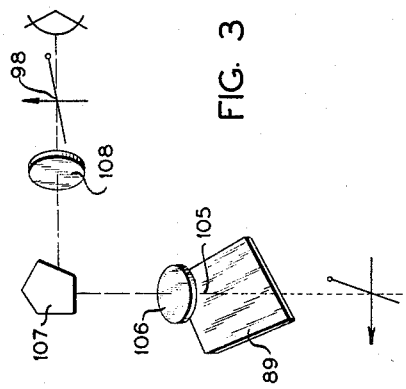
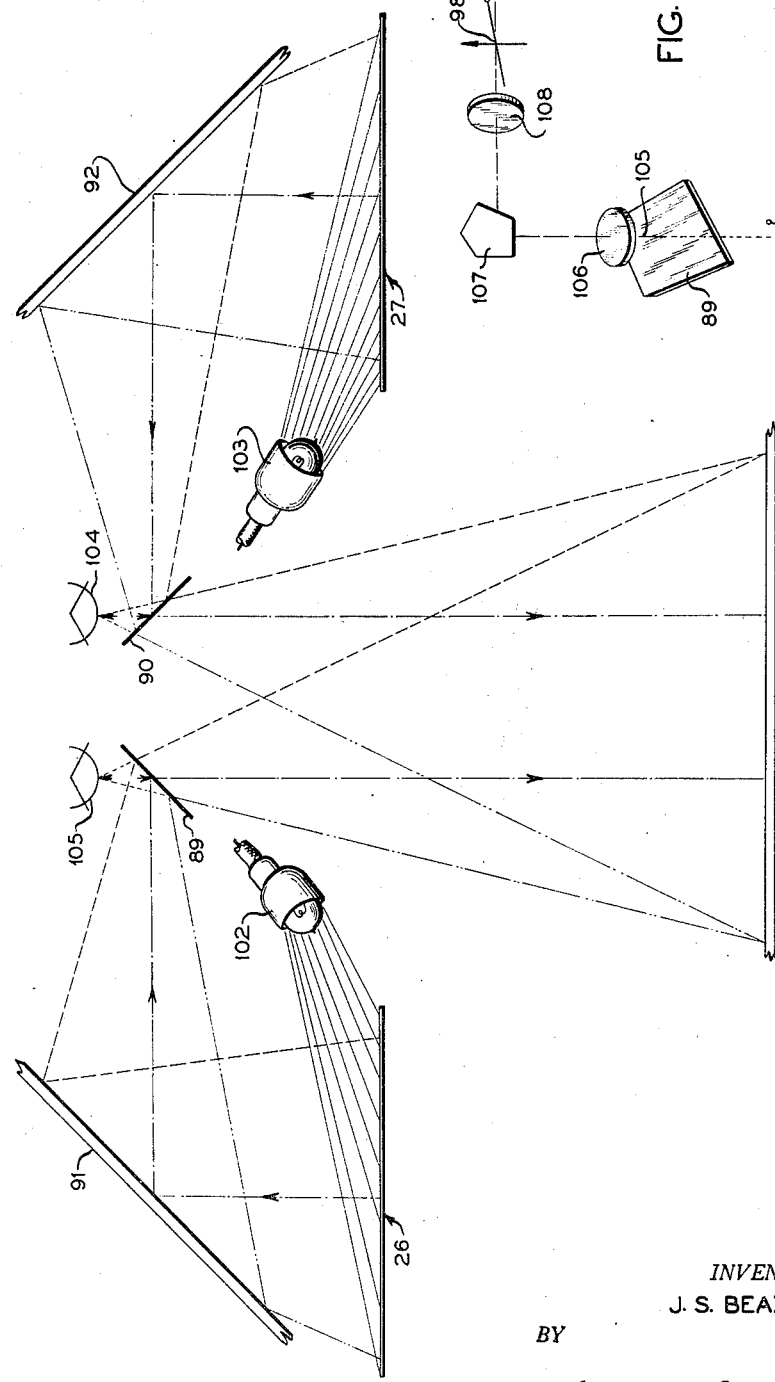
*INVENTOR.*
J. S. BEAZLEY
BY
A. Yates Dowell
ATTORNEY May 29, 1951 J. S. BEAZLEY 2,555,106
STEREOSCOPIC PLOTTING INSTRUMENT
Filed Oct. 8, 1946 3 Sheets-Sheet 3

INVENTOR.
J. S. BEAZLEY
BY
A. Yates Dowell
ATTORNEY

Patented May 29, 1951

2,555,106

UNITED STATES PATENT OFFICE 2,555,106

STEREOSCOPIC PLOTTING INSTRUMENT

Jon S. Beazley, Tallahassee, Fla.

Application October 8, 1946, Serial No. 702,027

1 Claim. (Cl. 88—29)

This invention relates to the art of making maps from stereoscopically overlapping aerial photographs of the terrain to be mapped and particularly to an improved instrument for producing on a mapping surface an apparent three dimensional model of the terrain shown in the photographs so that planimetric and contour maps may be produced by merely tracing the corresponding surface lines of the apparent model.

Various instruments have been proposed for accomplishing the above purpose but have been subject to certain defects and deficiencies which it is among the objects of the present invention to overcome. These previously proposed devices have as a rule been either inaccurate to an extent such that the maps produced by them have little value beyond affording mere general information as to the character of the area mapped or else have been so expensive that their cost is in most cases prohibitive and have been so complicated as to require an unduly long training period for personnel assigned to their operation.

A contributing factor to the inaccuracy of such previously proposed instruments has been the inability of such instruments to position the photograph prints in a manner to accurately simulate the position of the aerial camera with respect to the angular relationship between the focal axis of the camera, and the line between the zenith and nadiral point of the camera position at the time the photograph was taken, and to accurately position the two stereoscopically overlapping photographs to bring the overlap into exact coincidence.

It is among the objects of the present invention to provide a simplified instrument which can be economically produced, can be operated by an averagely intelligent operator after only a brief training period, and which will enable such an operator to produce maps of sufficient accuracy for military or statistical use.

A further object resides in the provision of an improved mapping instrument of the character indicated which can be used over long periods without inducing undue fatigue in an operator.

A somewhat more specific object resides in the provision of an improved mapping instrument for the production of maps from aerial photographs which is capable of positioning the photographs to accurately simulate the position of the aerial camera relative to the nadiral point of the camera position at the time the photographs were taken.

Figure 4:
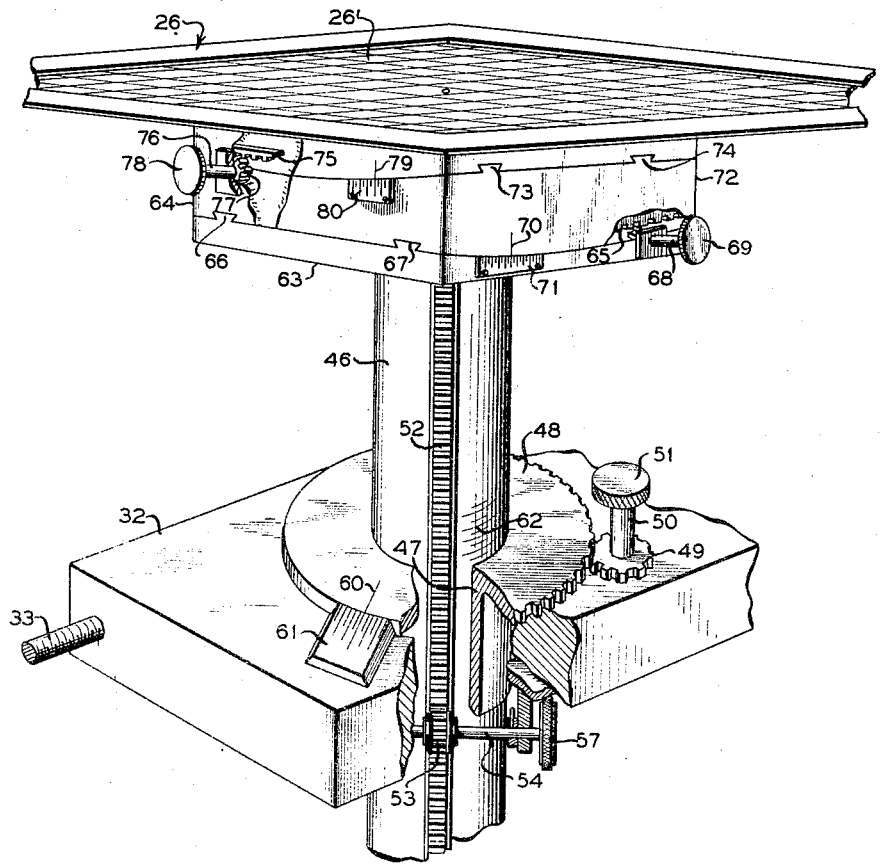
Figure 5:
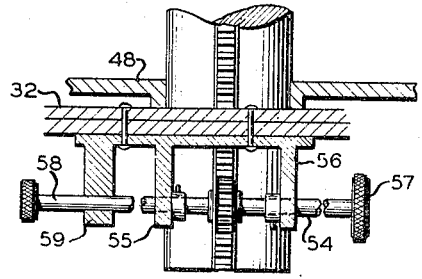

Other objects and advantages will become apparent as the description proceeds in conjunction with the accompanying drawings, wherein:

Fig. 1 is a perspective view of a mapping instrument illustrative of the invention;

Fig. 2, a diagrammatic illustration of the main optical system of the instrument;

Fig. 3, a diagrammatic view of the optical system of the viewing mechanism of the instrument;

Fig. 4, a perspective view of a photograph supporting table showing the various devices for adjusting the table in different planes; and Fig. 5, a detailed sectional view showing the mean for raising and lowering the photograph supporting tables of the instrument.

With continued reference to the drawings and particularly to Fig. 1, the improved instrument comprises a frame having four vertical legs, three of which are generally indicated at 10, 11, and 12. These legs are preferably arranged so that their center lines intersect the corners of a rectangular parallelogram and are rigidly held in operative position by horizontal frame members extending between them. For example, two vertically spaced frame members 13 and 14 extend between the legs 10 and 11 and constitute one end portion of the instrument frame and a similar pair of frame members 15 and 16 extend between the leg 12 and the corresponding leg, not illustrated, and constitute the opposite end of the instrument frame. A horizontal member 17 extends between the legs 10 and 12 to constitute one side of the frame and a similar member 18 extends between the leg 11 and the leg not illustrated to constitute the opposite side of the frame. Additional frame members and braces may be provided as may be found desirable or necessary to make the frame strong and rigid but the number of frame members should be definitely limited so that the instrument will be of light weight construction for easy handling and will not be unnecessarily expensive. Each of the legs is preferably formed from a short length of metal tubing and is interiorly screw threaded at one end. Exteriorly screw threaded leveling screws, as indicated at 19 and 20 for the legs 11 and 12, are threaded one into the lower end of each of the instrument legs to provide means for leveling the instrument with respect to the map plotting surface, such as the top of a table, upon which the instrument is supported when in use. Each of the adjusting bolts may conveniently comprise an exteriorly screw threaded stem portion 21 having at one end a peripherally roughened or knurled disk portion 22 for manually rotating the bolt and an axially extending tip or point 23 which contacts the supporting surface.

As will later appear, when the instrument is properly set up on the mapping surface to project an apparent model of the subject matter of the photographs onto the plotting surface, the instrument may be leveled by adjusting the leveling bolts until the model is brought to the proper position relative to the mapping surface. This may be done by bringing certain points of known elevation on the terrain which the model represent to the proper distance above the mapping surface in accordance with the scale of the model.

Two base members, as generally indicated at 24 and 25, for supporting the phototables, generally indicated at 26 and 27, extend between the frame members 17 and 18. Phototables 26 and 27 are provided with fiducial lines thereon forming grids 26' and 27' to assist in properly locating the photographs.

The base member 24 comprises a pair of parallel longitudinal members 28 and 29 connected at their ends by transverse members 30 and 31. Each of these longitudinal members is preferably made of material having a channel shaped cross section or is provided with longitudinal grooves to provide trackways for the edge portions of a movable base block 32. The base block 32 is moved through the space between the members 28 and 29 lengthwise of these members by suitable means such as the screw shaft 33 extending along the inner side of one of the members and provided at its end extending beyond one side of the frame with a hand wheel or screw head 34. The transverse end members 30 and 31 are provided with longitudinal grooves which overlie the vertical leg portions of frame members 17 and 18 of L-shaped cross section. These frame members are provided with longitudinally extending toothed racks, as indicated at 35 for the member 18, and a shaft 36 extends through the base 24 parallel to the member 29 thereof and is provided with gears, not illustrated, the teeth of which mesh with the frame carried racks so that upon rotation of this shaft the base 24 will be bodily moved transversely of the instrument along the frame members 17 and 18. The shaft 36 is provided with an operating screw head or hand wheel 37 similar to the hand wheel 34.

By means of the movable base 24 and base block 32 the phototable 26 may be moved in either direction along the $x$ and $y$ coordinates of the instrument. The movable base 25 is similar to the base 24 and has parallel longitudinal members 38 and 39 carrying the base block 40, adjustable lengthwise of the base by the screw shaft 41 rotated by a screw head or hand wheel 42 and is movable transversely of the instrument along the frame members 17 and 18 by shaft 43 having thereon suitable pinions, one of which is indicated at 44, meshing with the racks carried by the frame members 17 and 18 and rotated by a hand wheel 45. The base 25 and base block 40 thus provide means for moving the phototable 27 in both directions along both the $x$ and $y$ coordinates of the instrument.

As the means supporting the phototables 26 and 27 on the respective base blocks 32 and 40 are identical a detailed description of only one such supporting means is believed to be sufficient for the purpose of the present disclosure and for such a detailed description reference may now be had to Figs. 4 and 5, wherein the support for the phototable 26 has been selected for detailed illustration.

The movable base block 32 is provided with a central aperture through which extends a vertical cylindrical shaft or standard 46. The standard 46 extends through a sleeve 47 journalled in the aperture in the block 32 and is provided at its upper end with an integral partial gear 48. It is only necessary to provide enough teeth on this gear to permit rotation through an angle of approximately 60°. The under side of the gear 48 may contact the upper surface of block 32 to support the weight of the pedestal and phototable on the block. The sleeve 47 may be rotated by suitable means such as the small spur gear 49 which meshes with the gear 48. This spur gear is provided with an upstanding stem 50 carrying on its upper end a knurled thumb screw 51. Rotation of the thumb screw 51 will rotate the standard 46 about its axis, the difference in the size of the gears 48 and 49 providing a micrometer adjustment for this movement of the phototable.

A toothed rack 52 is provided along one side of the standard 46 and is engaged by a pinion 53 carried on a shaft 54 journalled in suitable apertured lugs or brackets 55 and 56 extending outwardly from the corresponding side of sleeve 47. Means such as a spline or keyway, not illustrated, is provided to prevent rotation of the pedestal 46 relative to the sleeve 47. The shaft 54 is provided on one end thereof with a thumb screw 57 by means of which the shaft may be rotated to raise or lower the standard 46 through the base block 32. A set screw 58 threaded through the aperture of a lug 59 depending from the under side of block 32 contacts the sleeve 56 to hold the standard 46 in any position of angular or vertical adjustment to which it has been brought by the thumb screws 51 and 57.

A reference mark 60 is provided on gear 48 and a graduated scale 61 is provided on the base block 32 so that the table may be brought to any desired position of angular adjustment and a scale 62 on one side of the standard 46 cooperates with the top edge of gear 48 to indicate the vertical position of the standard relative to its support.

By means of the two last described adjustments the table may be moved along the $z$ axis corresponding to the $x$ and $y$ axes described above and may also be rotated about this vertical axis, the purpose of such rotational adjustment being to bring the two stereoscopically overlapping photographs into a condition of stereoscopic coincidence.

At its upper end the pedestal 46 carries a head or block 63 having a cylindrically concave upper surface, the radius of curvature of which is substantially the same as the focal length of the lens of the aerial camera. A block 64 rests upon the head 63 and is provided with a convex lower surface having a cylindrical curvature the same as the concave cylindrical surface of the upper surface of head 63. This block 64 is provided on its lower surface with a pair of parallel toothed racks, one of which is indicated at 65, and with suitable guide means such as dove-tailed grooves 66 and 67 cooperating with corresponding tongues on the member 63 to hold the block 64 in operative position on the head 63. A shaft 68 is journalled in member 63 and is provided with pinions which mesh with the teeth of the racks on the bottom of member 64 and with a thumb screw 69 for rotating the shaft. When the shaft 68 is rotated the member 64 is moved across the cylindrical surface of member 63 and the phototable 26 is thus tipped about an axis perpendicular to the axis of standard 46.

A reference mark 70 is provided on block 64 and a scale 71 on the corresponding side of head 63 so that the position of block 64 relative to head 63 can be observed and duplicated whenever desired.

The upper surface of block 64 is also cylindrically concave and has a radius of curvature as great as the focal length of the aerial camera. The axis of the cylindrical curvature of the upper face of block 64 is perpendicular to the axis of the cylindrical curvature of the upper surface of head 63 and the two axes lie in parallel planes.

A second block 72 has a flat upper surface secured to the under surface of phototable 26 and a cylindrically convex lower surface having the same radius of curvature as the concave upper surface of block 64. The upper surface of block 64 may be provided with upwardly extending dove-tailed tongues 73 and 74 which fit slidably into corresponding grooves provided in the lower surface of block 72 to maintain block 72 in operative association with block 64, the guides including the tongues 73 and 74 being disposed at right angles to the guides 66 and 67.

The block 72 is provided in its under surface with a pair of parallel toothed racks, one of which is indicated at 75 and the shaft 76 is journalled in block 64 and is provided with pinions, one of which is indicated at 77, which mesh with the tooth racks on the block 72. A thumb screw 78 is secured on the projecting end of shaft 76 for rotating the shaft. Rotation of shaft 76 by thumb screw 78 will tip the phototable about an axis perpendicular to the vertical axis of the standard 46 and to the tilting axis between block 64 and head 63. A reference mark 79 is placed on block 72 and a corresponding scale 80 on block 64 whereby the angular position of block 72 relative to block 64 may be noted and duplicated when desired.

Frame members, as indicated at 81, 82, 83 and 84, extend upwardly from the legs 10, 11 and 12 and the omitted leg respectively and are bent over to provide horizontally extending portions. The horizontally extending portions of members 81 and 82 extend toward each other substantially parallel to frame member 17 and are again bent at right angles to provide portions 85 and 86, which extend transversely across the instrument parallel to the end frame portions thereof. Similarly, members 82 and 84 are bent over to provide horizontal portions extending substantially parallel to frame member 18 and are again bent at right angles to provide portions, as indicated at 86 and 87, which extend transversely across the frame toward the corresponding ends of members 84 and 85, respectively.

The end portions of members 84, 85, 86 and 87 support a frame 88 which carries two semi-transparent mirrors 89 and 90 disposed in planes extending substantially parallel to the end frame portions of the instrument and disposed at substantially 45 degrees to a plane including the frame members 17 and 18.

A pair of wing mirrors 91 and 92 are supported or respective rods 93 and 94. The rod 93 extends between the horizontally extending portions of members 81 and 82 and has its ends secured to these portions by suitable clips or brackets as indicated at 95. The rod 94 extends similarly between the horizontally extending portions of members 83 and 84. The wing mirror 91 is positioned immediately above the phototable 26 and has its surface in a plane extending parallel to the corresponding end portion of the frame and disposed at an angle of substantially 45 degrees to the frame members 17 and 18. The wing mirror 92 is disposed immediately above the phototable 27 and is inclined at an angle of 45 degrees with its upper edge toward the adjacent upper edge of mirror 91. The mirors 91 and 92 must be made with the reflecting surface on the front thereof in order to eliminate parallax.

A rigid bar 96 connects the upper edge portion of the two wing members 91 and 92 and this bar supports a viewing device, comprising a pair of telescopic members 98 and 99 having reflecting prisms 100 and 101 therein to change the angle of the light rays passing through the viewing device from generally vertical to generally horizontal so that a person looking into the horizontal portions of the viewing device may observe the apparent stereoscopic model on the plotting surface upon which the instrument rests.

The optical principle of the instrument is diagrammatically illustrated in Fig. 2. The upper surface of the phototable 26 is illuminated by a suitable shielded light source 102 and the upper surface of phototable 27 is illuminated by a similar shielded light source 103. If desired the intensity of light from these sources may be controlled by suitable rheostats, filters or other devices so that any difference in the intensity of light reflected from the two stereoscopic photographs can be compensated. Light is reflected from the photograph on the phototable 26 to the under surface of totally reflecting mirror 91 and from this mirror to the upper surface of semi-transparent mirror 89. Similarly light from source 103 is reflected from the photograph on phototable 27 to the under surface of totally reflecting mirror 92 and from this mirror to the upper surface of semi-transparent mirror 90 from which it is reflected upwardly to the viewing point 104, the light reflected upwardly from mirror 89 converging to a similar viewing point 105.

The viewing device is illustrated in principle in Fig. 3, which shows one side thereof, for example, the side including the telescope 98.

In this case, light reflected from the upper surface of mirror 89 is condensed by lens 106 and directed into a pentagonal prism 107 and from this prism through a second condensing lens 108 to the eye piece of telescope 98, the two lenses 106 and 108 and the prism 107 constituting the viewing telescope. The telescope 99 is similar in construction and receives light from the upper surface of semi-transparent mirror 90.

The telescopes are provided at the viewing ends with eye shields 109 and 110 respectively, preferably made of soft rubber which cushion the head of the operator and also exclude most of the outside light while the apparent model is being viewed.

Because of the semi-transparency of mirrors 89 and 90, light from the mapping surface 111 also passes through these mirrors to the viewing points 104 and 105 and through the telescopes to the eyes of the operator. With this arrangement the stereoscopic model produced by the stereoscopically overlapping photographs on the phototables 26 and 27 appears to rest on the mapping surface 111 and to have the three dimensions of the terrain of which the photographs were taken.

A plotting instrument, such as is employed with the conventional multiplex aero-projector, as described in "Engineering Applications of Aerial and Terrestrial Photogrammetry" (1938), by B. B. Talley, page 228, and illustrated in Patent No. 2,363,643, issued November 28, 1944 to C. O. Cook, for Stereoscopic Plotting Instrument, may be used to make the necessary lines on the plotting surface to constitute the desired map. Such a plotting instrument has a base movable over the plotting surface and is provided with a marking implement, such as a pencil, and a target supported on the base and adjustable up and down relative to the base. This target, when viewed through the stereoscopic instrument appears as a "floating mark" in the apparent stereoscopic model on the plotting surface. By maintaining this mark in contact with the surface of the apparent model in the usual manner, a map having the desired characteristics may be produced.

From the above disclosure it is apparent that the phototables may each be adjusted in six different ways to bring the two photographs into exact stereoscopic registry and to accurately compensate for any angular divergence between the focal axis of the aerial camera and the line joining the zenith and nadiral points of the camera position and for any difference in altitude between the two camera positions at which the two stereoscopically overlapping photographs were taken.

As the various adjustments are all in the nature of micrometer adjustments, the two photographs can quickly and positively be brought to positions at which they provide an accurate apparent image of the pictured terrain on the mapping surface. At the same time the instrument is light in weight, so that it can be easily handled and can be manufactured at a very moderate expense.

It will be obvious to those skilled in the art that various changes may be made in the invention without departing from the spirit and scope thereof and therefore the invention is not limited by that which is shown in the drawings and described in the specification but only as indicated in the appended claim.

What is claimed is:

A plotting instrument comprising a frame, means for adjustably supporting said frame on a plotting surface, a pair of base members mounted for longitudinal movement on said frame, cooperating rack and pinion means on said base members and said frame for moving said base members, a base block slidably mounted in each base member for movement transversely of said frame, lead screw means for moving said base blocks, a sleeve rotatably mounted in each base block for movement about a vertical axis, a standard slidably mounted in each sleeve for vertical movement, gear means for rotating said sleeve and said standard in either direction, cooperating rack and pinion means on said sleeve and said standard for moving said standard up or down, a table for mounting a stereoscopic picture secured to each standard, means including rack and pinion mechanism for tilting each table about two horizontal axes at right angles to each other, the radius of tilt being as great as the focal length of the camera with which said pictures were taken, whereby said pictures may be accurately oriented with respect to each other and simulating the relative camera positions when taken, means for illuminating each table, a mirror angularly disposed above each table for reflecting light rays reflected from said pictures, a pair of semitransparent mirrors positioned substantially midway between said first mentioned mirrors in the path of said reflected light rays and a pair of viewing telescopes disposed above said last mentioned mirrors for simultaneously viewing the image of said pictures reflected from said last mentioned mirrors and said plotting surface through said last mentioned mirrors.

JON S. BEAZLEY.

REFERENCES CITED

The following references are of record in the file of this patent:

UNITED STATES PATENTS

| Number | Name | Date |
|---|---|---|
| 1,126,353 | Becker | Jan. 26, 1915 |
| 1,652,271 | Cooke | Dec. 13, 1927 |
| 2,057,921 | Santoni | Oct. 20, 1936 |
| 2,263,971 | King et al. | Nov. 25, 1941 |
| 2,303,099 | Wernstedt | Nov. 24, 1942 |
| 2,363,643 | Cook | Nov. 28, 1944 |
| 2,377,509 | Miller | June 5, 1945 |

FOREIGN PATENTS

| Number | Country | Date |
|---|---|---|
| 267,594 | Great Britain | Mar. 16, 1927 |